United States Patent
Meddock et al.

(10) Patent No.: US 7,090,773 B2
(45) Date of Patent: Aug. 15, 2006

(54) COAXIAL FULL-FLOW AND BYPASS OIL FILTER

(75) Inventors: Leroy Meddock, Oceanside, CA (US); Mark Meddock, Oceanside, CA (US); Kenneth Swanson, Oceanside, CA (US)

(73) Assignee: SPX Corporation, Charlotte, NC (US)

( * ) Notice: Subject to any disclaimer, the term of this patent is extended or adjusted under 35 U.S.C. 154(b) by 413 days.

(21) Appl. No.: 10/734,977

(22) Filed: Dec. 15, 2003

(65) Prior Publication Data

US 2005/0126965 A1    Jun. 16, 2005

(51) Int. Cl.
    *B01D 35/14* (2006.01)
(52) U.S. Cl. ............. 210/342; 210/416.5; 210/DIG. 13
(58) Field of Classification Search ................ 210/342, 210/416.5, DIG. 13
    See application file for complete search history.

(56) References Cited

U.S. PATENT DOCUMENTS

| | | | |
|---|---|---|---|
| 2,057,219 A | 10/1936 | Vokes | 210/165 |
| 2,271,054 A | 1/1942 | Williams | 210/131 |
| 2,328,131 A | 8/1943 | Eisler | 177/311 |
| 2,680,520 A | 6/1954 | Beardsley | 210/164 |
| 2,734,636 A | 2/1956 | Foster | 210/164 |
| 2,748,949 A | 5/1956 | James | 210/183 |
| 2,843,268 A | 7/1958 | Kennedy | 210/295 |
| 2,879,892 A | 3/1959 | Frakes | 210/90 |
| 2,929,506 A | 3/1960 | Belgarde | 210/315 |
| 2,995,253 A | 8/1961 | Belgarde et al. | 210/323 |
| 3,073,451 A | 1/1963 | Stephenson | 210/85 |
| 3,127,255 A | 3/1964 | Winslow | 55/178 |
| 3,262,565 A | 7/1966 | Silverwater | 210/90 |
| 3,269,541 A | 8/1966 | Neely | 210/132 |
| 3,586,171 A | 6/1971 | Offer | 210/136 |
| 3,868,327 A | 2/1975 | Van Gilder et al. | 210/457 |
| 3,941,958 A | 3/1976 | Flesburg | 200/82 |
| 4,036,755 A | 7/1977 | Dahm et al. | 210/168 |
| 4,288,030 A | 9/1981 | Beazley et al. | 233/23 |
| 4,400,167 A | 8/1983 | Beazley et al. | 494/49 |
| 4,452,695 A | 6/1984 | Schmidt | 210/168 |
| 4,454,037 A | 6/1984 | Conterio et al. | 210/120 |
| 4,524,733 A | 6/1985 | Schmidt | 210/196 |
| 4,561,395 A | 12/1985 | McMullen | 210/196 |
| 4,629,558 A | 12/1986 | Garritty | 210/130 |
| 4,640,772 A | 2/1987 | Graham | 210/295 |
| 4,672,932 A | 6/1987 | Schmidt | 123/196 |
| 4,738,776 A | 4/1988 | Brown | 210/168 |
| 4,802,979 A | 2/1989 | Medley | 210/132 |
| 4,812,230 A | 3/1989 | Gerulis | 210/108 |
| 4,818,385 A | 4/1989 | Medley, III | 210/90 |
| 4,851,117 A | 7/1989 | Foust | 210/236 |
| 4,885,082 A | 12/1989 | Cantoni | 210/90 |
| 4,897,186 A | 1/1990 | Gerulis | 210/108 |

(Continued)

FOREIGN PATENT DOCUMENTS

DE    1253951    11/1967

(Continued)

*Primary Examiner*—Terry K. Cecil
(74) *Attorney, Agent, or Firm*—Baker & Hostetler LLP

(57) ABSTRACT

An improved combination full flow bypass oil filter is presented where the output of the bypass filter is obtained by non-venturi means and the extremely clean bypass filter output is measurable at all engine oil pressures. The bypass filter output is not blended with the full pass filtered oil until the bypass filtered oil is returned to the engine sump. Measurements have been made of this system that show positive bypass filter output in the range of 5 to 85 PSI engine oil pressure, the output a linear function of the oil pressure coming from the engine.

4 Claims, 8 Drawing Sheets

U.S. PATENT DOCUMENTS

| | | | |
|---|---|---|---|
| 4,976,854 A | 12/1990 | Yano et al. | 210/168 |
| 4,997,556 A | 3/1991 | Yano et al. | 210/136 |
| 5,066,391 A | 11/1991 | Faria | 210/85 |
| 5,070,831 A | 12/1991 | Yunick | 123/196 |
| 5,076,918 A | 12/1991 | Foust et al. | 210/238 |
| 5,078,877 A | 1/1992 | Cudabeck | 210/315 |
| 5,110,460 A | 5/1992 | Gilas | 210/149 |
| 5,180,490 A | 1/1993 | Eihusen et al. | 210/239 |
| RE34,274 E | 6/1993 | Foust | 210/236 |
| 5,230,795 A | 7/1993 | Yang | 210/236 |
| 5,246,086 A | 9/1993 | Yunick | 184/1.5 |
| 5,259,953 A | 11/1993 | Baracchi et al. | 210/232 |
| 5,342,511 A | 8/1994 | Brown et al. | 210/137 |
| 5,366,400 A | 11/1994 | Kucik | 440/88 |
| 5,431,588 A | 7/1995 | Kucik | 440/88 |
| 5,435,915 A | 7/1995 | Connors, Jr. | 210/232 |
| 5,462,679 A | 10/1995 | Verdegan et al. | 210/798 |
| 5,533,554 A | 7/1996 | Young | 141/383 |
| 5,546,979 A | 8/1996 | Clark, II et al. | 137/318 |
| 5,558,140 A | 9/1996 | Clark, II | 141/98 |
| 5,681,461 A | 10/1997 | Gullett et al. | 210/232 |
| 5,694,990 A | 12/1997 | Crima | 141/330 |
| 5,695,636 A | 12/1997 | Gullett | 210/232 |
| 5,695,637 A | 12/1997 | Jiang et al. | 210/316 |
| 5,702,602 A | 12/1997 | Brown et al. | 210/342 |
| 5,704,383 A | 1/1998 | Kammeraad et al. | 137/15 |
| 5,711,872 A | 1/1998 | Jones et al. | 210/130 |
| 5,738,785 A | 4/1998 | Brown et al. | 210/232 |
| 5,762,788 A | 6/1998 | Gullett | 210/232 |
| 5,775,385 A | 7/1998 | Tackett, Sr. | 141/98 |
| 5,846,416 A | 12/1998 | Gullett | 210/232 |
| 5,858,224 A | 1/1999 | Schwandt et al. | 210/90 |
| 5,902,479 A | 5/1999 | Fukumori et al. | 210/248 |
| 5,906,221 A | 5/1999 | Mancell | 137/549 |
| 5,972,210 A | 10/1999 | Munkel | 210/90 |
| 6,033,578 A | 3/2000 | Loewen | 210/767 |
| 6,068,762 A | 5/2000 | Stone et al. | 210/90 |
| 6,068,763 A | 5/2000 | Goddard | 210/130 |
| 6,084,915 A | 7/2000 | Williams | 375/242 |
| 6,090,276 A | 7/2000 | Ford | 210/167 |
| 6,139,725 A | 10/2000 | Barr | 210/90 |
| 6,168,722 B1 | 1/2001 | Olsen et al. | 210/767 |
| 6,267,875 B1 | 7/2001 | Leo | 210/90 |
| 6,270,660 B1 | 8/2001 | Roll et al. | 210/131 |
| 6,319,402 B1 | 11/2001 | Schwandt et al. | 210/323.2 |
| 6,319,417 B1 | 11/2001 | Rodibaugh | 210/787 |
| 6,378,706 B1 | 4/2002 | Verdegen et al. | 210/411 |
| 6,391,193 B1 | 5/2002 | Luka | 210/130 |
| 6,422,395 B1 | 7/2002 | Verdegen et al. | 210/411 |
| 6,444,123 B1 | 9/2002 | Caiozza | 210/223 |
| 6,478,958 B1 | 11/2002 | Beard | 210/323.2 |
| 6,485,637 B1 | 11/2002 | Jainek et al. | 210/130 |
| 6,488,848 B1 | 12/2002 | Smith | 210/301 |
| 6,540,914 B1 | 4/2003 | Smith | 210/297 |
| 6,544,412 B1 | 4/2003 | Michels et al. | 210/130 |
| 6,551,506 B1 | 4/2003 | Caiozza | 210/222 |
| 6,585,887 B1 | 7/2003 | Michels et al. | 210/130 |
| 6,641,742 B1 | 11/2003 | Prater et al. | 210/767 |
| 6,666,968 B1 | 12/2003 | Smith et al. | 210/254 |
| 6,679,990 B1 | 1/2004 | Reinhart | 210/232 |
| 6,758,969 B1 | 7/2004 | Caiozza | 210/223 |
| 6,758,980 B1 | 7/2004 | Prater et al. | 210/767 |
| 6,770,110 B1 | 8/2004 | Seifert et al. | 55/498 |
| 6,783,665 B1 | 8/2004 | Girondi | 210/86 |
| 6,787,033 B1 | 9/2004 | Beard | 210/323.2 |
| 6,793,818 B1 | 9/2004 | Entringer et al. | 210/238 |
| 6,863,811 B1 | 3/2005 | Janik | 210/232 |
| 6,872,304 B1 | 3/2005 | Gebert | 210/232 |

FOREIGN PATENT DOCUMENTS

| | | |
|---|---|---|
| FR | 1264502 | 6/1961 |
| SU | 517700 | 6/1976 |

US 7,090,773 B2

COAXIAL FULL-FLOW AND BYPASS OIL FILTER

FIELD OF THE INVENTION

This invention relates to the field of oil filters and automotive technology.

BACKGROUND OF THE INVENTION

The typical engine oil filter system is a single pass, full flow filter that cleans the oil as it flows from the engine oil pump and then directs the flow to the oil galleys and other lubricated components of the engine. In order to more completely cleanse the oil, and to enable longer service life of the oil and engine components, additional, supplemental filtration in the form of by pass filtration is often utilized.

By pass filtration is achieved by diverting a small portion of an engines oil flow from a source under pressure, directing the flow slowly through a dense filter media and returning the bypass-filtered oil to the engine sump. In most applications of full flow and bypass technology, each of these filters are separate units with the full flow filter mounted directly to the engine and the by pass unit mounted remotely, connected to the engine oil system via hoses or other plumbing.

Presently, there are several prior art designs for combining the full flow filter with a by pass filter all in the same housing.

In order to utilize these various combined full flow/by pass filter units one of two conditions must be met:

1. The engine and its oil filtration mounting apparatus must be designed for a specific combination filter unit. This combined full flow/by pass unit will not be readily useable on other engine designs. Thus the advantages offered by this type of full flow/by pass filter system are only available to a small and limited population of engines.

2. There are some generic types of full flow/by pass filter systems available that can be adapted to the general population of engines. However, these are after-market add-on products resulting in ad hoc mounting, often requiring special mounting brackets, remote filter head adapters and lengthy connecting hoses all of which are departures from the original engine design.

A further problem, especially with the first filters mentioned above, is that the rate of oil flow through the by pass portion of the combined full flow/by pass filter system must be taken as an article of faith. The separate, independent, and measurable flow of oil through the by pass portion cannot be observed or positively verified.

It is an object of this invention to provide a combination full flow/by pass engine oil filtration system that is easily adaptable to virtually all present day internal combustion engines, requiring no modification to said engine.

It is a further object of this invention to provide a means to readily measure and verify the separate oil flow through the by pass portion of the claimed filtration system.

BRIEF SUMMARY OF THE INVENTION

This invention is designed to provide a high-quality, dependable, combination full flow and bypass filter for lubrication fluids used in modern internal combustion engines.

This invention combines two coaxial cylindrical oil filters with a novel recovery system for returning the oil from the bypass filter to the engine sump, or other relatively low-pressure destination. The bypass filter removes essentially all solid contaminants from a fraction of the engine oil that enters the subject filter, and this clean fraction is returned to the engine oil supply, resulting in a steadily increasing level of oil cleanliness until a steady-state of cleanliness is reached.

The present invention uses a non-venturi method of moving a fraction of the oil from the full flow through the bypass filer, unlike the previous state of the art filters. There are two embodiments of the present invention presented, a completely disposable system and a replaceable system.

The replaceable system possesses a metal full-pass filter screen and a replaceable bypass filter element made of fiber, which can be removed from the filter canister and replaced with a new bypass filter element.

OBJECTS OF THE INVENTION

It is an object of this invention that the full flow and bypass filter canister system be compatible with existing engine mounts and require no special equipment be mounted on the engine.

It is an object of this invention that it work with any engine using any standard oil pump and that it not need modifications to a pressure regulator or a pressure relief valve to operate with standard engine oil pressures.

It is an object of this invention that positive fluid flow through both filters can be demonstrated at any engine speed, which competing designs have failed to do.

BRIEF DESCRIPTION OF THE DRAWINGS

The construction and operation of the invention can be readily appreciated from inspection of the drawings that accompany this application, combined with the detailed specification to follow.

DETAILED DESCRIPTION OF THE INVENTION

Figure 1:
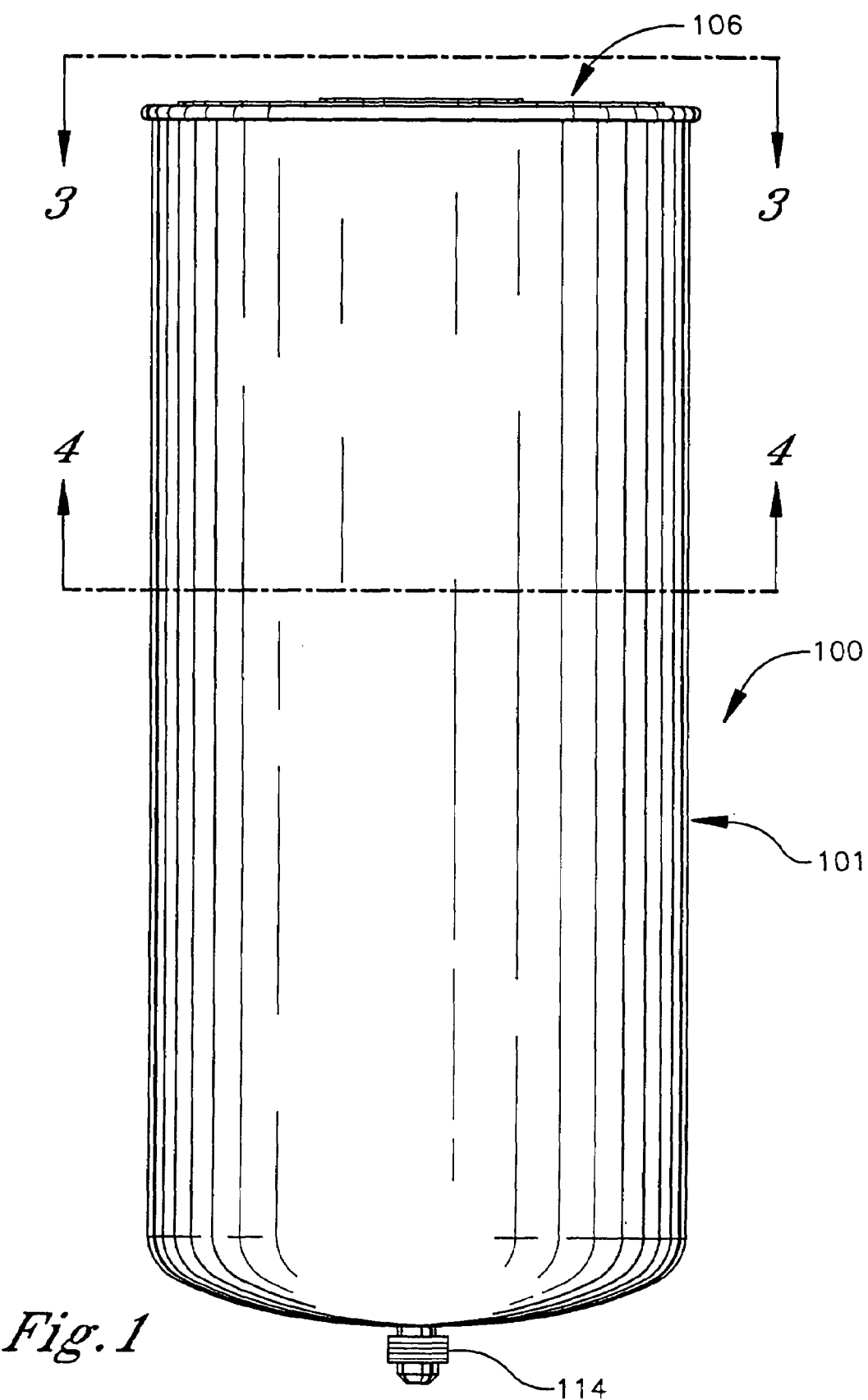
FIG. 1 is an exterior view of the completely disposable embodiment.
Figure 2:
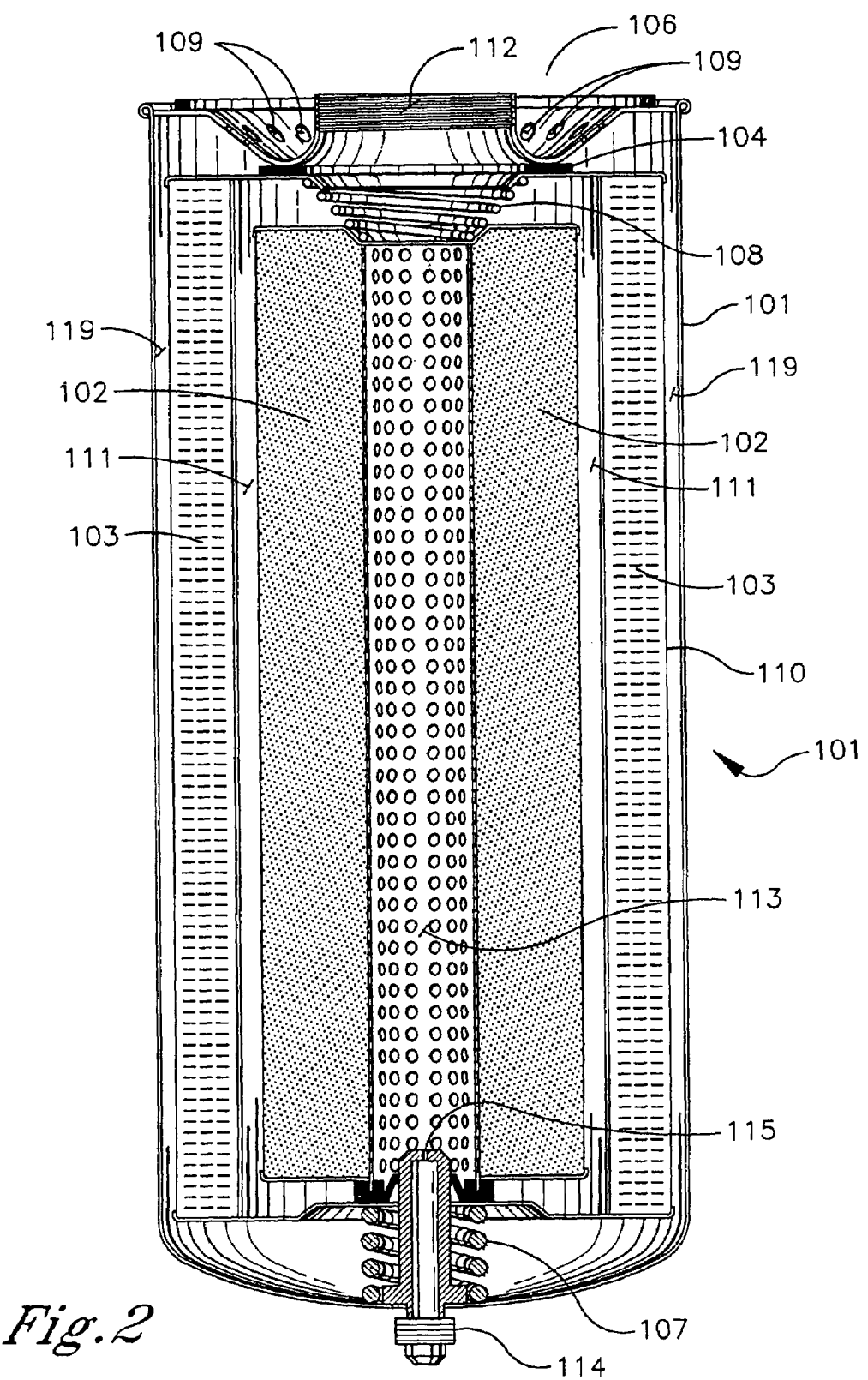
FIG. 2 is a cut-away drawing of the completely disposable embodiment of this invention.
Figure 3:
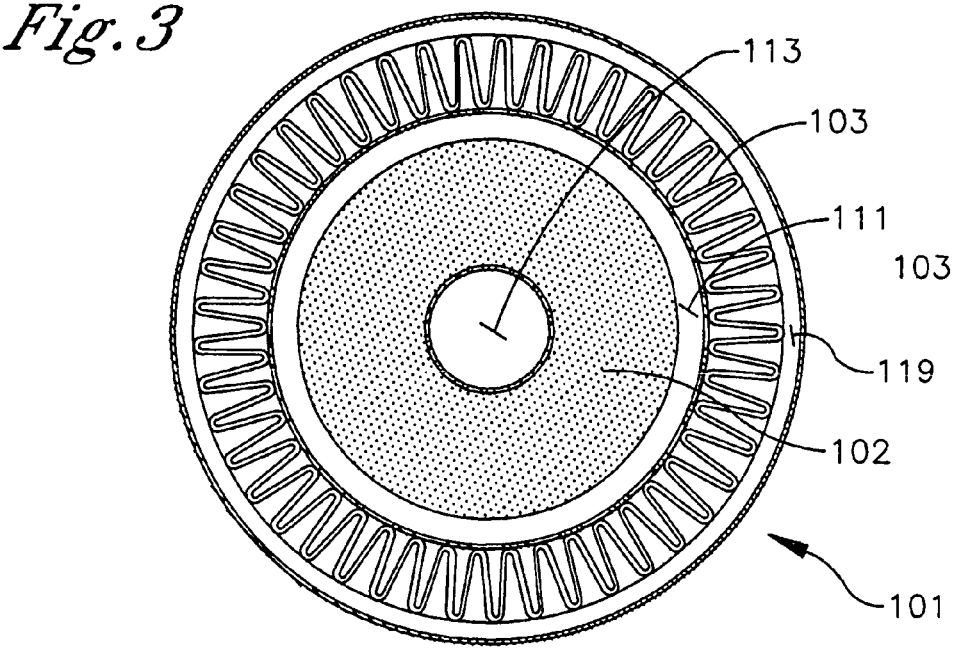
FIG. 3 is a cross-section of the completely disposable embodiment.
Figure 4:
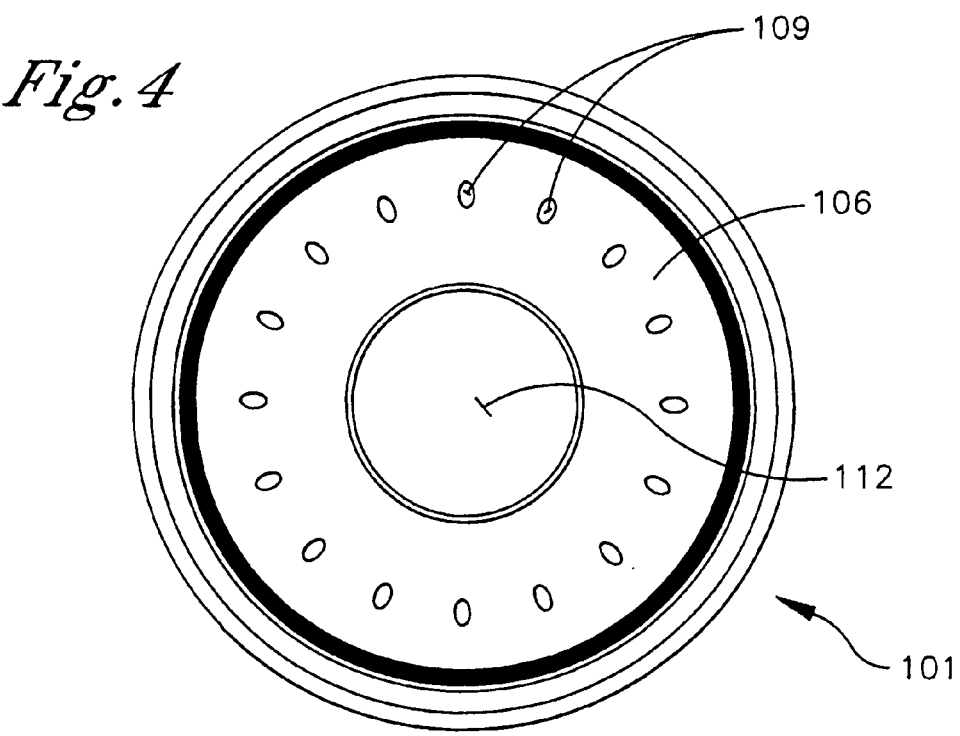
FIG. 4 is a bottom view of the completely disposable embodiment of this invention
Figure 5:
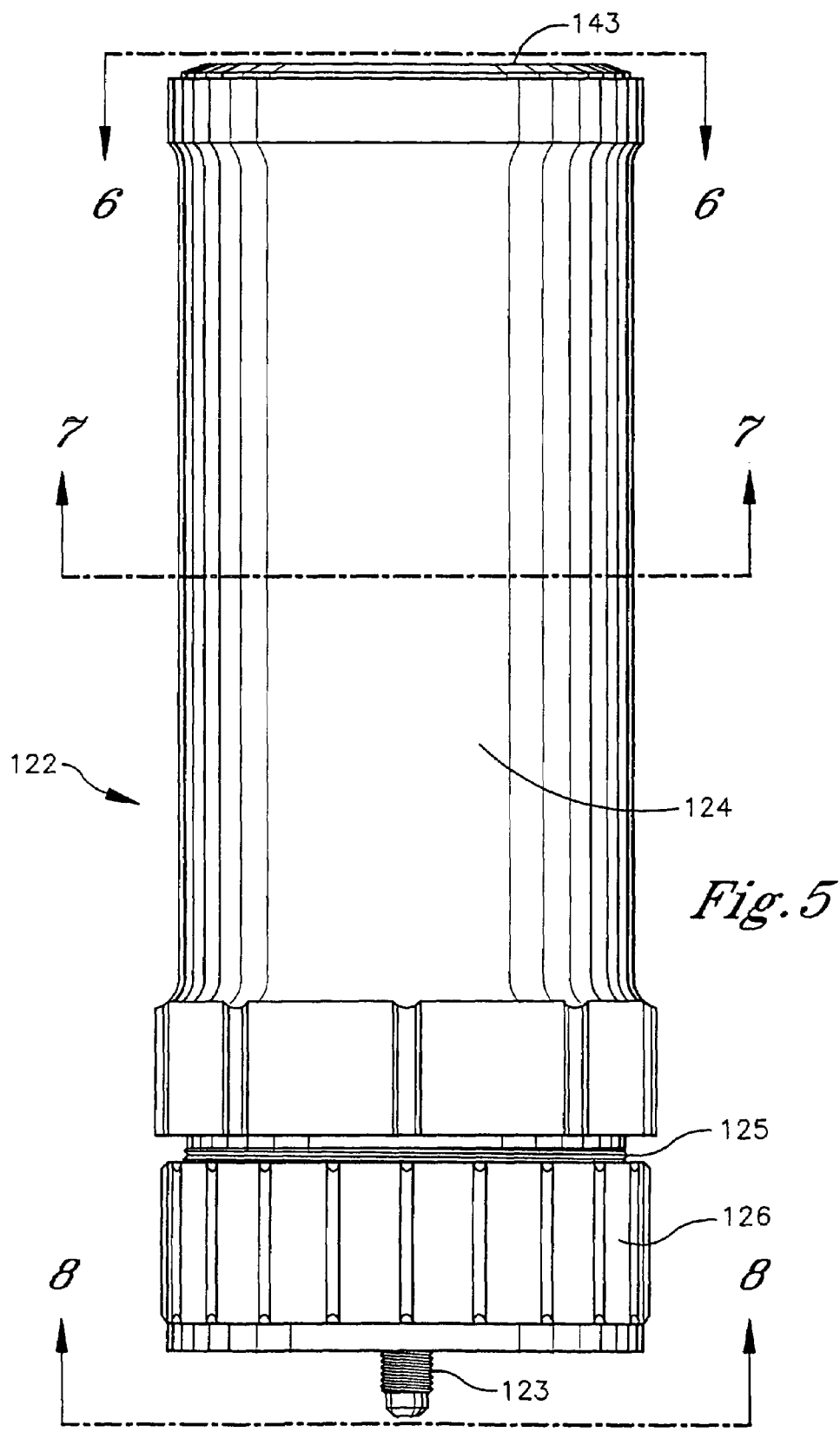
FIG. 5 is an exterior view of the replaceable embodiment.
Figure 6:
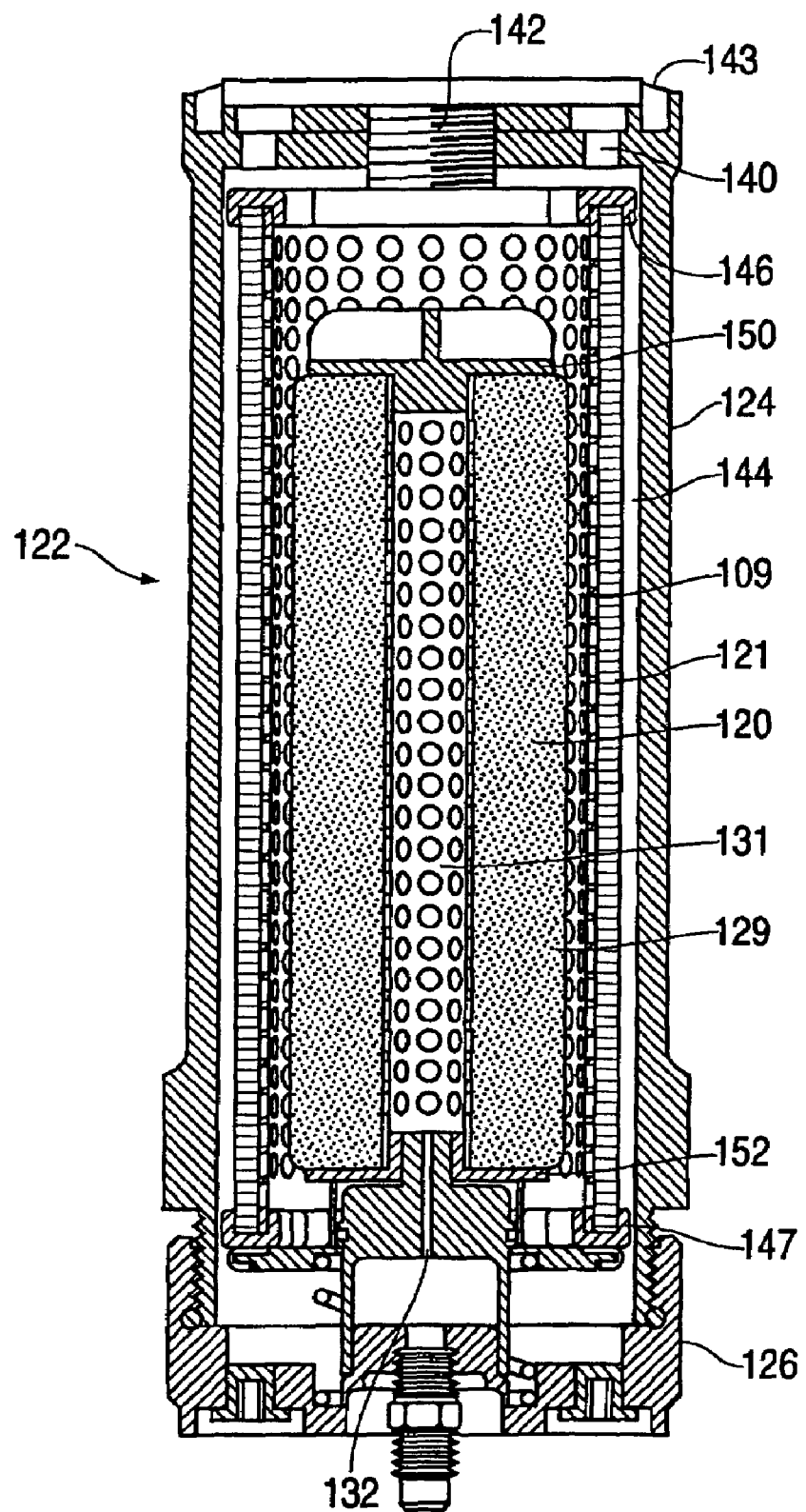
FIG. 6 is a cutaway diagram of the replaceable embodiment.
Figure 7:
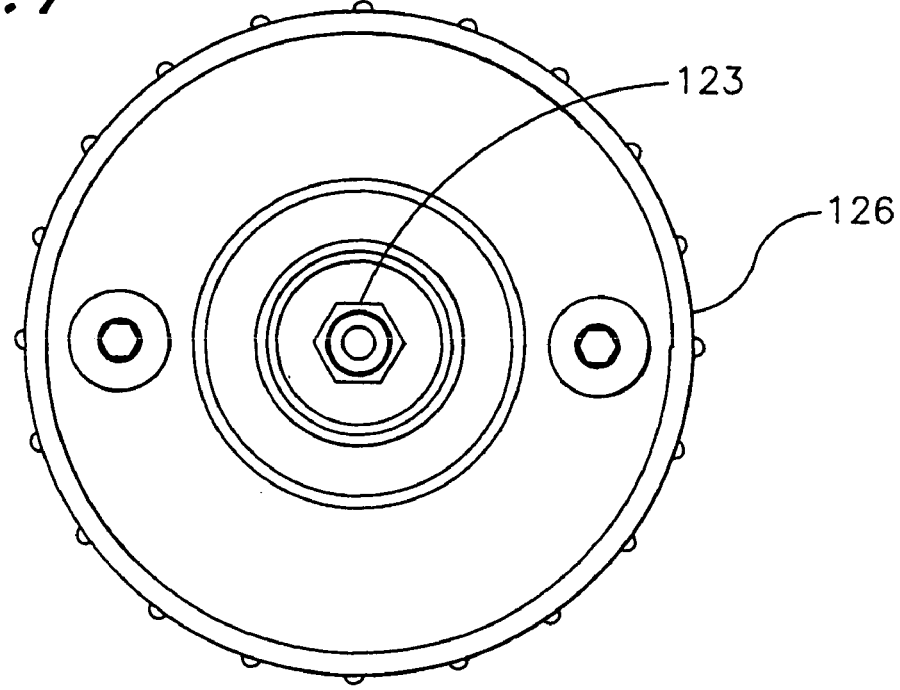
FIG. 7 is a top view of the replaceable embodiment.
Figure 8:
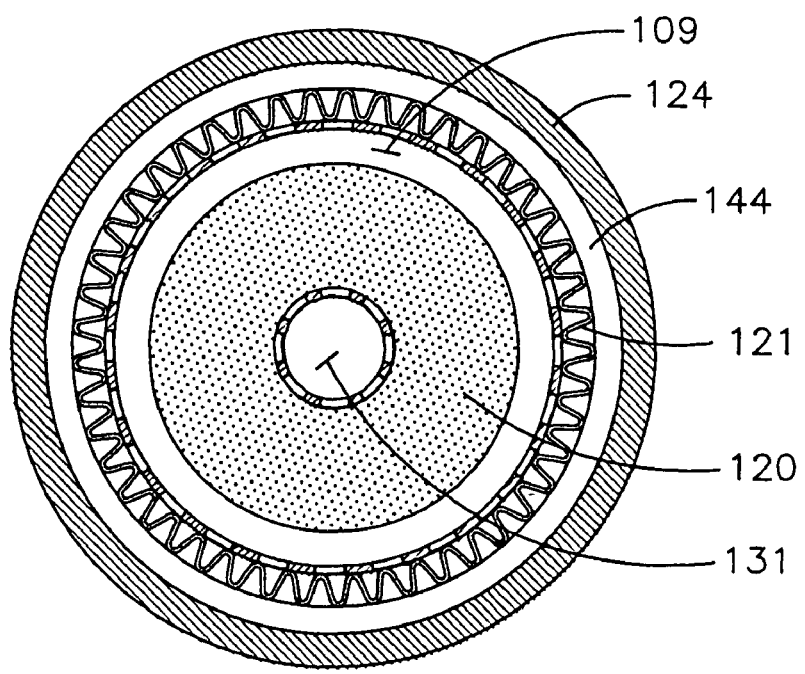
FIG. 8 is a cross-section of the replaceable embodiment.
Figure 9:
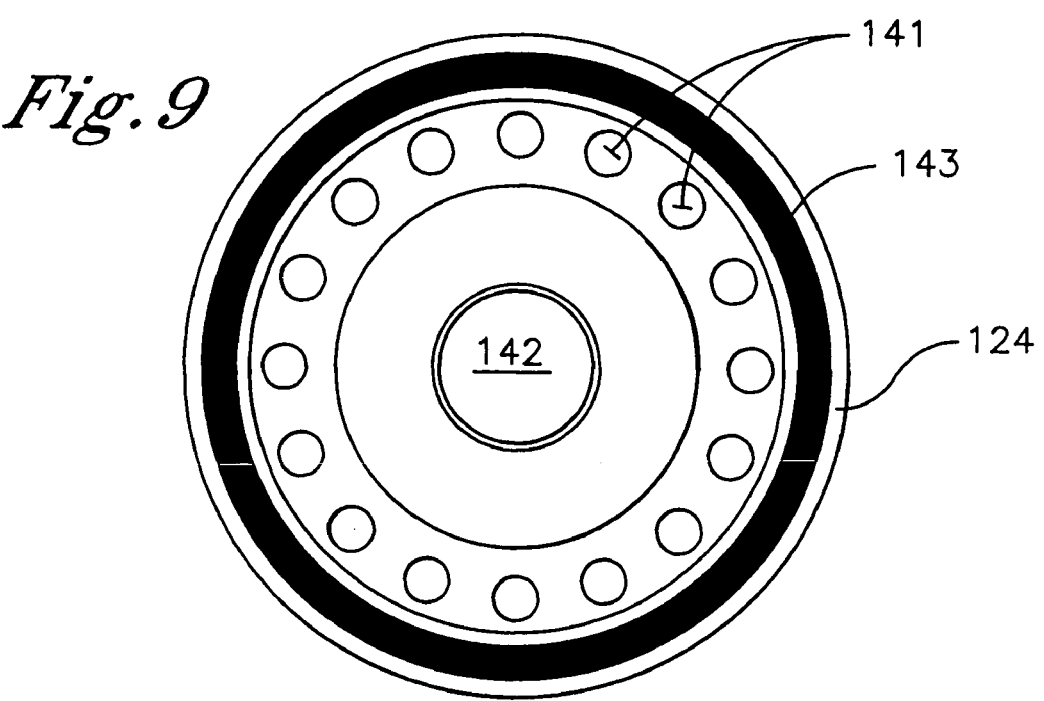
FIG. 9 is a bottom view of the replaceable embodiment.

Referring to FIG. 1, FIG. 2, FIG. 3, and FIG. 4, the invention$^{100}$ in its completely disposable version, the preferred embodiment, is shown. The general structure of the invention is a canister$^{101}$ surrounding two coaxial filters, the bypass filter$^{102}$ with a smaller diameter than the full flow filter$^{103}$. The bypass filter$^{102}$ is placed within the hollow interior of the full flow filter$^{103}$ as shown. The full flow filter$^{103}$ is held against the full flowgasket 104 near the threaded engine mounting plate or "tap plate"$^{106}$ of the canister$^{101}$ by a large spring$^{107}$ while the bypass filter is held against the bypass gasket by a small spring$^{108}$.

The operation of the filter is that fluid enters the canister[101] through perforations[109] in the tap plate[106] and flows down the outer circumferential area[119] of the canister, entering the full flow filter[103] circumferentially at the outside surface[110] of the full flow filter[103] and proceeding towards the axis of the filter under pressure. The fluid then enters the transition space[111] between the filters and most of that fluid exits the filter canister[101] and directly enters the engine through the discharge opening[112] of the tap plate[106]. A fraction of the oil in the transition space[111] enters the bypass filter[102] and exits the bypass filter[102] into the bypass collection space[113], whereupon it exits the filter canister through the bypass flow control orifice[115] and discharge port[114].

The bypass discharge port[114] is connected via hose (not shown) to some low pressure point within the engine where oil can be returned to the engine oil sump. The differential in pressure between the fluid entering the canister[101] and the pressure at the destination of the hose from the bypass return port[114] draws a measurable fraction of the total system oil flow through the denser bypass filter[102]. Eventually, all of the fluid passes through the bypass filter[102] and is cleaned to the dimensions allowed by the bypass filter[102]. It is a feature of this invention that the fluid is not blended when it leaves the canister, but the bypass filter[102] output is separately directed to the oil sump or other destination.

The bypass filter[102] is comprised from a list of materials such as wound cotton and other dense fibers. The full flow filter[103] is comprised of a material selected from a list including pleated paper and metal mesh.

An alternate embodiment of the present invention in FIGS. 5 through 9 involves a disposable bypass filter element[120] and a cleanable filter screen[121], made of steel in the preferred instantiation of this embodiment. The filter canister system[122] is held together at the end where the bypass return port[123] exits by means of screw threads[125], where the canister body[124] is connected to the canister bottom cap[126]. When the canister bottom cap[126] is unscrewed, the cleanable filter screen[121] can be lifted out and cleaned, later to be replaced. The used bypass filter[120] can be replaced with a clean one, the bottom cap[126] screwed back on with the entire unit remaining connected to the engine. As an alternative to the cleanable filter screen[121], a standard pleated paper full flow filter could be used in this design, making the filters completely replaceable.

The fluid flow path is similar to the preferred embodiment. Fluid enters from the engine directly into the chamber[140] and then passes through several flow passages[141] arrayed circumferentially around the full flow discharge opening[142] at the base of the canister body[124], flows down the canister sides[144] and traverses the filter screen[121] to the transition space[129], where under differential engine pressure, a fraction of the fluid enters the bypass filter[120] and makes it through to the interior of the filter[131], where it exits through the bypass return orifice[132].

The gasket[143] for the replaceable embodiment seals the combined full flow/bypass filtration system to the engine filter mount (not shown). Gaskets[146, 147] prevent the oil from taking a short-cut from the chamber[140] to the transition space[129] or from the canister sides[144] to the transition space[129].

The four-bladed anti-blockage cap[150] on top of the bypass filter[120] prevents the bypass filter[120] from blocking oil flow through the rest of the filter, through the filter screen[121], in the event the bypass filter[120] breaks free of its mount[152] inside the filter canister. If that should happen, without the four-bladed anti-blockage cap[150] present, the bypass filter[120] could plug the full flow discharge opening[142], starving the engine for oil and causing catastrophic engine failure.

The dimensions of the disposable filter's bypass return orifice[115] and its equivalent on the replaceable embodiment are important to the effectiveness of the bypass filter[102, 120], and the inventors have discovered that a dimension of 1 millimeter is optimal for this outlet from the bypass filters[102, 120].

It is a feature of this invention that this full flow and bypass filter canister system is compatible with existing engine mounts and requires no special equipment be mounted on the engine.

Figure 10:
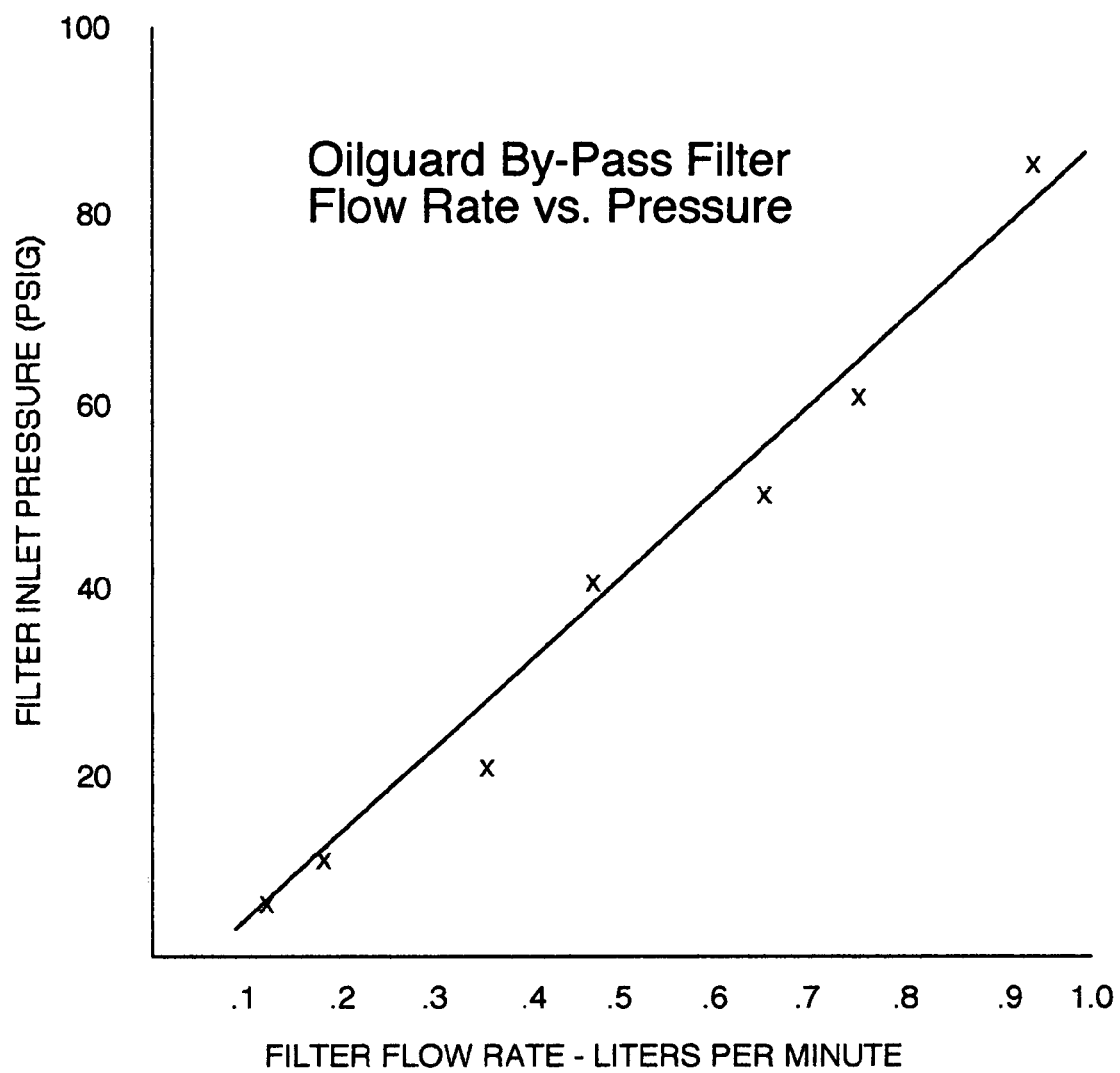
FIG. 10 is a chart showing measured output from the bypass filter as a function of filter inlet pressure

It is also a feature of this invention that positive fluid flow can be demonstrated through both filters of the system at any engine speed, which competing designs have failed to do. In FIG. 10, the almost linear output of pure oil from the bypass filter[102] through the bypass flow control orifice[115] is shown for the preferred embodiment of the invention.

While the preferred embodiment and a first alternate embodiment of the invention have been described, modifications can be made and other embodiments of this invention realized without departing from the intent and scope of any claims associated with this invention.

The invention claimed is:

1. A combination filter for removing particulate matter from engine oil, comprising: a canister, a full flow filter, a bypass filter, a plurality of engine oil inlets, a full flow filter outlet, a bypass filter outlet, and an engine mounting means, the canister comprises a roughly cylindrical shape, closed at one end and open at a second end, the canister closed end possessing a single opening through which the bypass filter outlet passes, the canister open end possessing a plurality of engine oil inlets and an engine mounting means, the full flow filter comprising a cylindrical tube that fits inside the canister, an outer circumferential area existing between the outside of the full flow filter and the inside wall of the canister, the full flow filter sealed to the open end of the canister with gaskets such that oil may enter the open end of the canister and must flow into the outer circumferential area, the full flow filter made of porous material such that oil must flow through the full flow filter from the outer circumferential area through the full flow filter into a transition space, the bypass filter comprising a cylindrical tube smaller in diameter than the full flow filter placed coaxially within the full flow filter in the transition space, the bypass filter sealed at each end of the tube such that oil may pass circumferentially from the transition space through the bypass filter into a bypass collection space, the majority of oil in the transition space exiting the transition space through a full flow filter outlet in the open end of the canister, the full flow filter outlet opening passing through the engine mounting means, the bypass filter possessing a metal cap with a plurality of blades at the end of the bypass filter closest to the canister open end, the metal cap positioned such that if the bypass filter moves towards the canister open end the metal cap will prevent the bypass filter from plugging the full flow filter outlet, the engine mounting means comprising a screw-thread connector that fits internal combustion engine oil filter mounts, the bypass collection space connected via a bypass return orifice to the bypass filter outlet, the bypass return orifice comprising a narrow tube of metal, the bypass return orifice being one (1) millimeter in width, the bypass filter outlet capable of being connected via connectors to a hose which can be lead to any engine oil destination on a internal combustion engine, the oil output of the bypass filter though the bypass filter outlet being a measurable amount which is a function of the amount of oil introduced at the engine oil inlets through a range of engine oil pressures from 5 pounds per square inch to 100 pounds per square inch, the oil output from the bypass filter through the bypass filter outlet never mixes with the oil from the full pass filter until the oil from the bypass filter outlet is returned to the engine at a point other than the engine mounting means.

2. The combination filter of claim 1, where the canister is in two pieces, an upper canister and a base canister, the upper canister screwing into threads in the base canister, the base canister possessing the engine mounting means and the plurality of oil inlet ports, the upper canister possessing the bypass filter outlet, the bypass filter capable of being removed and replaced by unscrewing the upper canister from the base canister and removing the upper canister, the bypass filter then lifted out and a new bypass filter replaced, the upper canister then screwed back into the base canister, the full flow filter capable of being cleaned by unscrewing the upper canister from the base canister, then removing the bypass filter, then cleaning the full flow filter, then replacing the bypass filter, and then screwing the upper canister back into the base canister.

3. The combination filter of claim 2 where the full flow filter is comprised of steel mesh and the bypass filter is comprised of cotton fiber.

4. The combination filter of claim 1 where the bypass filter is comprised of cotton fibers and the full flow filter is comprised of paper.

* * * * *